United States Patent [19]

Kang

[11] Patent Number: 4,944,097
[45] Date of Patent: Jul. 31, 1990

[54] MEASURING TAPE WITH LIGHT

[75] Inventor: Dongmin Kang, Pusan, Rep. of Korea

[73] Assignee: Korea Measures Co., Ltd., Pusan, Rep. of Korea

[21] Appl. No.: 391,479

[22] Filed: Aug. 9, 1989

[30] Foreign Application Priority Data

Mar. 20, 1989 [KR] Rep. of Korea .................... 3426[U]

[51] Int. Cl.$^5$ .............................................. G01B 3/10
[52] U.S. Cl. .................................... 33/760; 242/107.3
[58] Field of Search ................ 33/759, 760, 767, 770; 362/186, 198, 202; 242/107.12, 107.3, 107.6

[56] References Cited

U.S. PATENT DOCUMENTS

| | | | |
|---|---|---|---|
| 4,067,513 | 1/1978 | Rutty et al. | 242/107.3 |
| 4,516,325 | 5/1985 | Cohen et al. | 33/767 |
| 4,663,854 | 5/1987 | Miller et al. | 33/767 |

OTHER PUBLICATIONS

"Ruler Has Built In Flashlight", *Popular Mechanics*, p. 252, Jan. 1949.

*Primary Examiner*—William A. Cuchlinski, Jr.
*Assistant Examiner*—D. Price
*Attorney, Agent, or Firm*—Notaro & Michalos

[57] ABSTRACT

A measuring tape assembly comprises a housing containing a rolled measuring tape which extends through a lower hole in a front wall of the housing. The upper portion of the housing contains a flashlight which directs light at an angle through an upper portion of the front wall. A switch is positioned at the top of the housing near the front wall and a tape engaging clamp is positioned on the bottom of the housing near the front wall. A spring biases the clamp into engagement with the tape so that the tape is held in any desired extended position. Pressing the clamp upwardly against its spring permits the tape to withdraw back into the housing under the influence of a conventional spiral spring which is connected to the measuring tape roll.

8 Claims, 3 Drawing Sheets

MEASURING TAPE WITH LIGHT

FIELD AND BACKGROUND OF THE INVENTION

The present invention relates in general to measuring tapes, and in particular to a new and useful measuring tape assembly which includes a flashlight for illuminating the measuring tape and a clamp for exerting pressure on the tape to hold the tape in an extended position.

A variety of measuring tape assemblies are known which utilize a roll of measuring tape held within a housing on a spool. The spool is generally equipped with a spirally wound spring which functions to retract the tape into the housing when the tape is released. While some tape assemblies include clamps for holding the tape in an extended position, the clamps are generally awkward to engage and disengage.

When using known measuring tape assemblies at night or in dark places, it is also necessary to provide an artificial light source in order to view the measuring tape. If a flashlight is used for this purpose, it becomes difficult to hold and manipulate the tape while at the same time holding the flashlight.

SUMMARY OF THE INVENTION

The present invention comprises a tape assembly which includes an internal flashlight for illuminating a measuring tape contained within the assembly, as well as a clamp which is biased by a spring against the tape to hold the tape in any desired extended position. The tape is mounted on a conventional spring loaded spool. By releasing pressure on the clamp, the tape is withdrawn into the assembly.

The measuring tape assembly comprises a housing which carries the internal flashlight on one side. The internal flashlight includes a bulb which is aimed at an angle toward the tape for illuminating the tape. The clamp is positioned on an opposite side of the housing and under the tape so that it can be conveniently pressed by the finger of a hand holding the housing. A switch for activating and deactivating the flashlight is positioned on an opposite side of the housing from the clamp. This location is selected so that the switch can be conveniently activated by a finger or thumb of the hand holding the measuring tape assembly.

Accordingly, an object of the present invention is to provide a measuring tape assembly which includes a flashlight having a switch located for ease of operation.

Another object of the present invention is to provide a measuring tape assembly including a clamp which is biased for clamping the measuring tape in an extended position, with the clamp being positioned for easy access in order to release the measuring tape.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
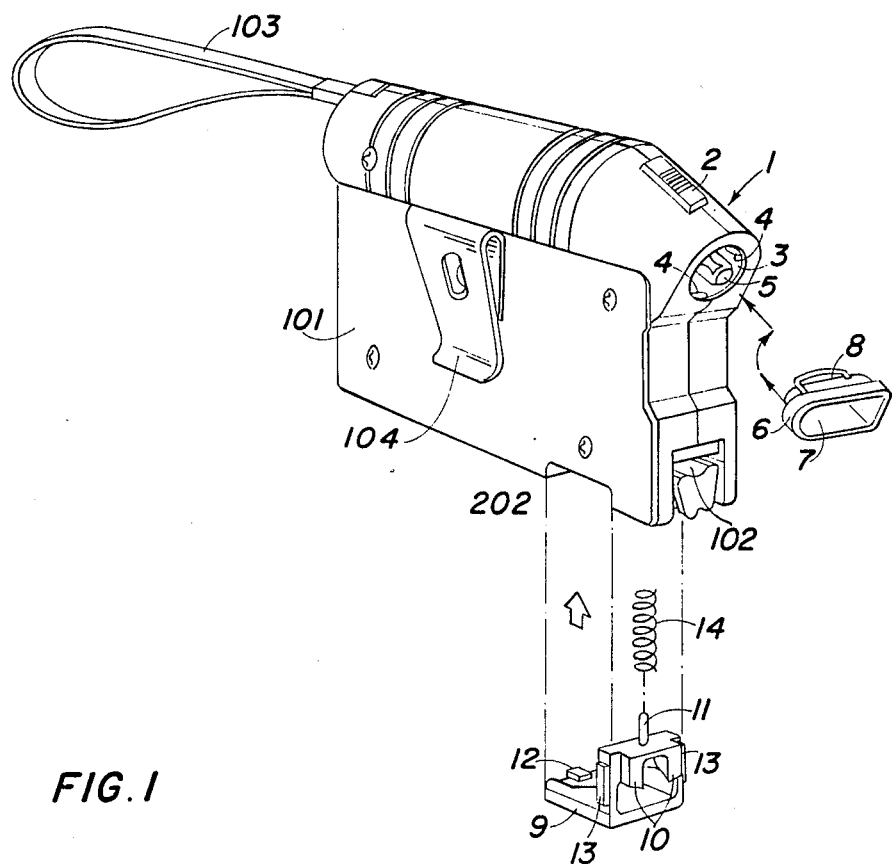
FIG. 1 is an exploded perspective view of a measuring tape assembly in accordance with the present invention.

Referring to the drawings in particular, the invention embodied therein comprises a measuring tape assembly having a housing 101 made of two halves of plastic of metal which are held together by a plurality of screws. Housing 101 contains a roll of measuring tape 102 which is mounted on a spring loaded spool (not shown) of known design. The spring loaded spool applies tension to the measuring tape which tends to retract the tape into the housing.

A loop 103 is fixed at an upper rear end of the housing for convenience in manipulating and carrying the housing. A clip 104 is connected to one side of the housing so that the housing can be carried on a belt or the like.

Figure 2:
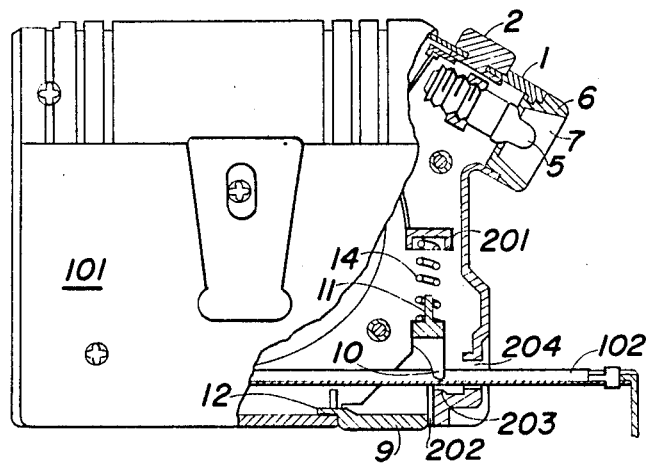
FIG. 2 is a side elevational view, with portions cut away for clarity, of the assembly illustrated in FIG. 1.
Figure 5:
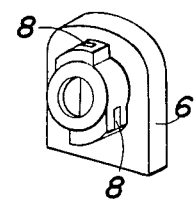
FIG. 5 is a perspective view of a flashlight cap used in the measuring tape assembly.
Figure 6:
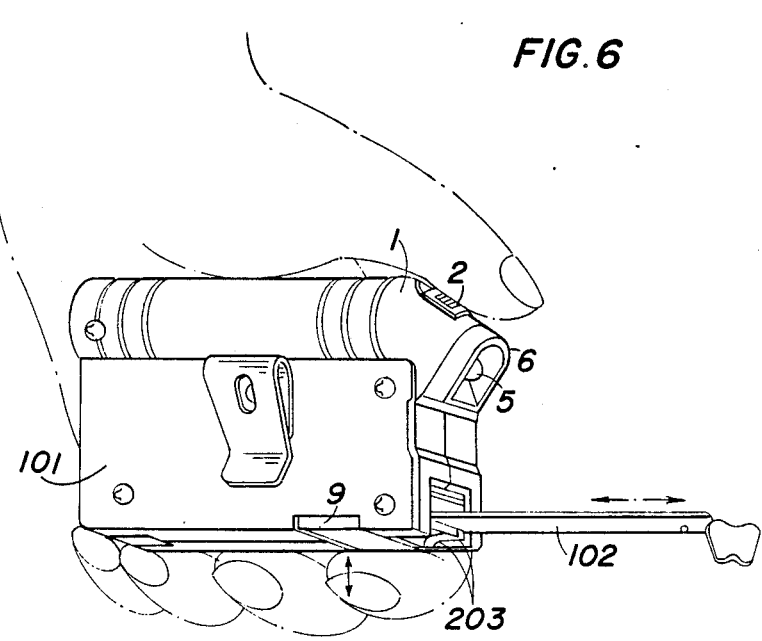
FIG. 6 is a perspective view of the measuring tape assembly in use.

Housing 101 includes an upper partially cylindrical portion containing a flashlight generally designated 1 and a lower rectangular portion. As shown in FIGS. 1 and 2, a bulb 5 is mounted within a space 3 formed at the upper front end of the housing. A battery (not shown) is contained within the cylindrical portion of the housing and powers the bulb 5 through an activating slide switch 2 mounted at the front top surface of the housing. A flashlight cap 6 having a curved top and flat bottom as shown in FIGS. 1, 5 and 6, includes a bore for receiving the front end of bulb 5, and a space 7 for engagement around the front end of the bulb. Cap 6 includes a pair of arcuate grooves 8 which are engageable with a pair of opposed tongues 4 which project inwardly of space 3. Cap 6 is held at 90° to it ultimate position as shown in FIG. 1 and is inserted into the space 3. The cap is then rotated through 90° to engage the grooves 8 onto the tongues 4 to bring the cap into its fixed position shown in FIG. 6.

Figure 4:
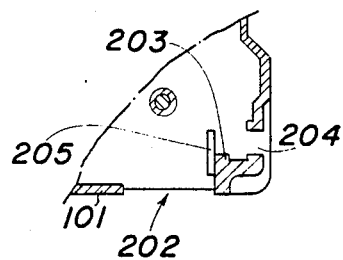
FIG. 4 is a fragmentary sectional view of a housing for the measuring tape assembly with the clamp and measuring tape missing to reveal details of the housing.

As best shown in FIGS. 1, 2 and 4, a square hole 204 is provided at the lower end of the front wall of housing 101. Measuring tape 102 can be extended from and retracted into the hole 204.

The lower wall of housing 101 includes an opening 202 near the front wall of the housing. A pair of vertical grooves 205 are positioned on opposite sides of the opening 202 and extend upwardly therefrom. As shown in FIGS. 4 and 6, housing 101 has a pair of upwardly facing supporting jaws 203 which are positioned in front of opening 202. The fixed jaws 203 are used in conjunction with a pair of moveable jaws 10 mounted on an L-shaped clamp 9 which is positioned for movement within opening 202.

As shown in FIGS. 1 and 2, clamp 9 has an upstanding leg with opposite vertical rails 13 that respectively slide in vertical grooves 205 for vertical movement of the clamp. A tab 12 projects from the rear end of clamp 9 and extends over a rear edge of opening 202 for retaining the clamp in the housing.

A pin 11 formed as one piece with clamp 9, extends upwardly into a coil spring 14 which is compressed between the upstanding leg of the clamp 9 and a spring support 201 formed in the housing 101. Spring support 201 is positioned centrally between the sides of the housing and near the front wall thereof.

Figure 3:
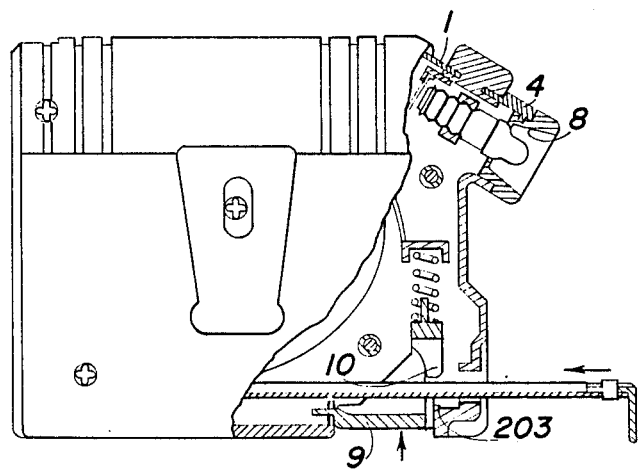
FIG. 3 is a view similar to FIG. 2 showing a measuring tape clamp of the assembly in a released position.

Spring 14 biases clamp 9 downwardly to clamp tape 102 between moveable jaws 10 on clamp 9 and fixed jaws 203 in housing 101. Tape 102 can be pulled from the housing 101 against the friction between jaws 10, 203. For more easily withdrawing the tape and, after a measurement has been taken, for permitting the tape to be retracted into the housing 102, clamp 9 can be pressed from below as shown in FIG. 3. This lifts jaws 110 from the tape and releases the tape for retraction into the housing under the influence of the spool spring.

As shown in FIG. 6, the housing 101 is conveniently grasps in the hand. Clamp 9 is positioned at the bottom and near the front of the housing so that it can easily be depressed by the index finger of the hand. Switch 2 is convenient activated by the thumb of the hand since the switch is positioned near the top front of the housing. The flashlight 1 is also angled so that it aims toward the tape when the tape is withdrawn from the housing. Unlikely some conventional tape assemblies which include a clamp which must be manually engaged and disengaged from the tape, clamp 9 is normally biased by spring 14 into a clamping position so that the tape is held automatically. Depressing the clamp permits the tape to freely retract into the housing. Depressing the clamp also relieves all pressure on the tap so that is can more easily be withdrawn from the housing.

While a specific embodiment of the invention has been shown and described in detail to illustrate the application of the principles of the invention, it will be understood that the invention may be embodied otherwise without departing from such principles.

What is claimed is:

1. A measuring tape assembly comprising:
   a housing having a front wall with a lower hole therethrough, said housing defining an upper space opening through an upper portion of said front wall;
   a flashlight in said upper space for directing light outwardly from said front wall;
   a measuring tape rolled in said housing and extending through said lower hole for projecting out of said housing;
   a clamp mounted for movement in said housing adjacent said lower hole, said clamp including at least one jaw for engagement with said measuring tape to hold said measuring tape in a projected position from said housing;
   a spring engaged between said housing and said clamp for biasing said clamp downwardly to engage said jaw against said measuring tape, at least a portion of said clamp being accessible from outside said housing for raising said clamp against said spring to release said tape;
   said housing having a bottom wall with an opening therethrough positioned near said front wall, said clamp comprising an L-shaped member having a lower leg positioned in said bottom wall opening and an upstanding leg having a passage through which said measuring tape extends, said upstanding leg carrying said at least one jaw, said housing including at least one supporting jaw positioned below said measuring tape near said lower hole and aligned with said jaw on said clamp for engagement of said measuring tape;
   a pin extending upwardly from said upstanding leg, said housing including a spring support positioned above said upstanding leg, said spring comprising a coil spring engaged around said pin and compressed between said spring support and said upstanding leg; and
   said flashlight comprising a bulb mounted in said upper space, a switch slidably mounted to a top of said housing near said front wall and a cap having an opening therethrough for engagement onto said bulb, said cap including a pair of retaining grooves and said upper space including a pair of projecting tongues for engagement with said pair of grooves for retaining said cap over said upper space.

2. An assembly according to claim 1 wherein said cap includes an arcuate top portion and a flat bottom portion and defines a space for engagement around at least a portion of said bulb.

3. An assembly according to claim 2 wherein said bulb extends at an angle to said front wall for directing light toward said measuring tape when said measuring projects out of said housing.

4. An assembly according to claim 3 including a clip connected to one side of said housing and a loop connected to a rear wall of said housing positioned oppositely from said front wall.

5. A measuring tape assembly comprising:
   a housing having a front wall with a lower hole therethrough, said housing defining an upper space opening through an upper portion of said front wall;
   a flashlight in said upper space for directing light outwardly from said front wall;
   a measuring tape rolled in said housing and extending through said lower hole for projecting out of said housing;
   a clamp mounted for movement in said housing adjacent said lower hole, said clamp including at least one jaw for engagement with said measuring tape to hold said measuring tape in a projected position from said housing; and
   a spring engaged between said housing and said clamp for biasing said clamp downwardly to engage said jaw against said measuring tape, at least a portion of said clamp being accessible from outside said housing for raising said clamp against said spring to release said tape;
   said flashlight comprising a bulb mounted in said upper space, a switch slidably mounted to a top of said housing near said front wall and a cap having an opening therethrough for engagement onto said bulb, said cap including a pair of retaining grooves and said upper space including a pair of projecting tongues for engagement with said pair of grooves for retaining said cap over said upper space.

6. An assembly according to claim 5 wherein said cap includes an arcuate top portion and a flat bottom portion and defines a space for engagement around at least a portion of said bulb.

7. An assembly according to claim 6 wherein said bulb extends at an angle to said front wall for directing light toward said measuring tape when said measuring projects out of said housing.

8. A measuring tape assembly comprising:

a housing having a front wall with a lower hole therethrough, said housing defining an upper space opening through an upper portion of said front wall;

a flashlight in said upper space for directing light outwardly from said front wall;

a measuring tape rolled in said housing and extending through said lower hole for projecting out of said housing;

a clamp mounted for movement in said housing adjacent said lower hole, said clamp including at least one jaw for engagement with said measuring tape to hold said measuring tape in a projected position from said housing;

a spring engaged between said housing and said clamp for biasing said clamp downwardly to engage said jaw against said measuring tape, at least a portion of said clamp being accessible from outside said housing for raising said clamp against said spring to release said tape; and a clip connected to one side of said housing and a loop connected to a rear wall of said housing positioned oppositely from said front wall.

* * * * *